United States Patent
Gaither et al.

(10) Patent No.: US 10,696,288 B2
(45) Date of Patent: Jun. 30, 2020

(54) ELECTRONIC ALL-WHEEL-DRIVE ESCAPE SYSTEMS AND METHODS

(71) Applicant: Toyota Motor Engineering & Manufacturing North America, Inc., Plano, TX (US)

(72) Inventors: Geoffrey D. Gaither, Brighton, MI (US); Shinichiro Tomoda, Kasuga (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 189 days.

(21) Appl. No.: 15/803,629

(22) Filed: Nov. 3, 2017

(65) Prior Publication Data
US 2019/0135262 A1 May 9, 2019

(51) Int. Cl.
| | |
|---|---|
| *B60K 17/356* | (2006.01) |
| *B60K 23/08* | (2006.01) |
| *B60K 6/52* | (2007.10) |
| *B60L 3/10* | (2006.01) |
| *B60W 10/119* | (2012.01) |
| *B60W 10/02* | (2006.01) |
| *B60W 30/02* | (2012.01) |
| *B60W 40/10* | (2012.01) |
| *B60W 50/00* | (2006.01) |

(52) U.S. Cl.
CPC .......... *B60W 10/119* (2013.01); *B60W 10/02* (2013.01); *B60W 30/02* (2013.01); *B60W 40/10* (2013.01); *B60W 2050/0058* (2013.01); *B60W 2520/26* (2013.01); *B60W 2530/20* (2013.01)

(58) Field of Classification Search
CPC ........ B60K 17/356; B60K 23/08; B60K 6/52; B60L 2260/28; B60L 3/106
See application file for complete search history.

(56) References Cited

U.S. PATENT DOCUMENTS

| | | | | |
|---|---|---|---|---|
| 5,758,014 A | * | 5/1998 | Young | ........................ B60L 3/10 388/815 |
| 6,149,544 A | * | 11/2000 | Masberg | .................. B60K 6/26 477/13 |
| 8,521,384 B2 | | 8/2013 | O'Connor | |
| 8,936,119 B1 | | 1/2015 | Valler | |

(Continued)

FOREIGN PATENT DOCUMENTS

JP      2008149978 A * 7/2008 ............ B60W 10/06

OTHER PUBLICATIONS

Toyota AWD-i System (https://www.torquenews.com/1083/can-2016-toyota-rav4-hybrid-s-odd-awd-system-really-handle-snow), dated Sep. 29, 2017; 2 pages.

*Primary Examiner* — Tisha D Lewis
(74) *Attorney, Agent, or Firm* — Sheppard, Mullin, Richter & Hampton LLP; Hector A. Agdeppa; Daniel N. Yannuzzi

(57) ABSTRACT

A method for an assist mode in a motorized vehicle includes receiving signals from a plurality of vehicle sensors monitoring respective conditions of the vehicle; an assist mode circuit determining whether a loss-of-traction condition is being experienced by the vehicle using information in the signals received from at least one of the plurality of vehicle sensors; activating an assist mode of the vehicle if the assist mode circuit determines that a loss-of-traction condition is being experienced, wherein the assist mode alters vehicle drive train characteristics.

23 Claims, 8 Drawing Sheets

(56) References Cited

U.S. PATENT DOCUMENTS

| | | | |
|---|---|---|---|
| 9,481,243 B2 | 11/2016 | Larkin | |
| 2003/0019674 A1 | 1/2003 | Duan | |
| 2012/0217916 A1* | 8/2012 | Wu | H02P 21/0025 |
| | | | 318/400.11 |
| 2014/0054100 A1 | 2/2014 | Boskovitch | |
| 2015/0175009 A1* | 6/2015 | Beever | B60K 7/0007 |
| | | | 701/22 |
| 2016/0121883 A1* | 5/2016 | Mao | B60W 30/02 |
| | | | 701/69 |
| 2017/0137023 A1* | 5/2017 | Anderson | B60G 17/0195 |
| 2017/0334427 A1* | 11/2017 | Butcher | B60K 6/48 |
| 2018/0194341 A1* | 7/2018 | Owen | B60K 6/48 |
| 2018/0281603 A1* | 10/2018 | Nordmann | B60K 7/0007 |

* cited by examiner

US 10,696,288 B2

ELECTRONIC ALL-WHEEL-DRIVE ESCAPE SYSTEMS AND METHODS

TECHNICAL FIELD

The disclosed technology relates generally to electronic all-wheel-drive systems for automobiles and other vehicles, and more particularly, some embodiments relate to systems and methods for implementing an escape function with electronic all-wheel-drive.

DESCRIPTION OF THE RELATED ART

All-wheel-drive systems have increased in popularity over the years. These systems boast improved all-whether performance as well as dynamic benefits on dry roads. All-wheel-drive systems can be beneficial in snowy or icy conditions as well as wet conditions because they can apply torque to each wheel of the vehicle. They can even improve dry-road performance such as, for example, by allowing a greater amount of torque to be applied with a reduced likelihood of wheel slippage.

Early four-wheel-drive systems used locking differentials to lock the run and rear driveshafts of the vehicle so that torque can be applied at all four wheels. However, there was some limited utility to the systems in that each axle would always turn at the same speed. These systems had limited or no ability to divide torque judiciously between front and rear axles. While they provided the advantage of using all four wheels to drive the vehicle (in the case of a four-wheeled vehicle), finer control of torque delivery was generally not available.

All-wheel-drive, on the other hand, typically provides the ability to control torque delivery to the axles for more control over the relative power delivered to the front and rear axles. This is often accomplished by a center differential to control torque delivery to the front and rear axles. An open differential, for example, has been used to split the torque provided by the transmission to the front and rear axles, and allows them to rotate at different speeds. Most open differentials, however, cannot control the split of the torque applied and allow the torque to flow to the path of least resistance. Accordingly, manufacturers have compensated for this problem by applying the vehicle's brakes to the slipping wheel, increasing the resistance to the application of torque at that wheel and causing torque to be applied to the other wheels. In other applications, the center differential is able to make a more judicious split of the available torque based on the available traction at each wheel. This can be accomplished by passive configurations such as the limited-slip differential.

All-wheel-drive can also be accomplished without a center differential. For example, clutch packs or gearing arrangements can be used to redirect torque to the non-slipping axle. These systems are sometimes referred to as on-demand all-wheel-drive systems, because the torque can be applied to either or both axles as it is needed. An example of an intelligent all-wheel-drive system is the Toyota dynamic Torque Control AWD. This system relies on information from a plurality of sensors that monitor vehicle parameters such as vehicle speed, steering angle, throttle angle and yaw rate to determine conditions such as wheel slippage, hard acceleration, and hard cornering. Based on this sensed information, the all-wheel drive system automatically diverts torque to the rear wheels to help the vehicle regain traction. The system uses an electromagnetically controlled coupling in the rear differential, so that rear torque can be distributed at varying ratios. For example, the ratios may vary from 100:0 to 50:50.

The Toyota Hybrid System-II (THS-II) is another approach to implementing all-wheel drive. This system uses two kinds of motive power sources, i.e., a high-efficiency gasoline engine that utilizes the Atkinson Cycle, which is a high-expansion ratio cycle, as well as a permanent magnet AC synchronous motor, a generator, high-performance nickel-metal hydride (Ni-MH) battery and a power control unit. This power control unit contains a high-voltage power circuit for raising the voltage of the power supply system for the motor and the generator to a high voltage in addition to an AC-DC inverter for converting between the AC current from the motor and the generator and the DC current from the hybrid battery. Other key components include a power split device, which transmits the mechanical motive forces from the engine, the motor and the generator by allocating and combining them. The power control unit precisely controls these components at high speeds to enable them to cooperatively work at high efficiency.

In THS, the engine, the generator, the motor and the wheels are linked together via the power split device. Furthermore, most of the engine power is converted into electrical energy by the generator, and the high-output and high-response motor drive the vehicle. Consequently, when the vehicle's driving power changes abruptly, e.g., wheel slippage on icy or other slippery surfaces and wheel locking during braking, a protection control similar to that used in conventional traction control is used to prevent abrupt voltage fluctuation and revolution increase of the planetary gear in the power split device. THS II utilizes the characteristics of the high-output, high-response motor to restore traction when wheel slippage on a snowy road is detected, for example, and it can inform the driver of the slipping situation.

BRIEF SUMMARY OF EMBODIMENTS

Embodiments of the technology disclosed herein are directed toward devices and methods for detecting the occurrence of a loss-of-traction event and entering an assist mode to provide traction assistance to help overcome the loss-of-traction event. According to one embodiment of the disclosed technology a method for an assist mode in a hybrid electric vehicle includes: receiving signals from a plurality of vehicle sensors monitoring respective conditions of the vehicle; an assist mode circuit determining whether a loss-of-traction condition is being experienced by the vehicle using information in the signals received from at least one of the plurality of vehicle sensors; and activating an assist mode of the vehicle if the assist mode circuit determines that a loss-of-traction condition is being experienced, wherein the assist mode alters vehicle drive train characteristics.

In various embodiments the loss-of-traction condition may include one or more of wheel slippage, roll or pitch of the vehicle when the vehicle is stationary, sinking of the vehicle, a change in a left/right or front/rear slip ratio of the vehicle, and a lowering of vehicle tire pressure by greater than a predetermined amount.

In another embodiment, an assist mode circuit for a motorized vehicle is provided. The assist mode circuit can include, in various embodiments: a plurality of sensors to sense vehicle conditions; a communications receiver to receive information from at least one of the plurality of sensors regarding the vehicle conditions; an assist-mode circuit to determine whether the vehicle is encountering a loss-of-traction event and to activate a vehicle assist mode if the assist-mode circuit determines that the vehicle is encountering a loss-of-traction event; a communications transmitter to transmit instructions to a vehicle system to implement the assist mode. The plurality of sensors may include at least one of a wheelspin sensor, a tire pressure monitoring system, a three axis accelerometer, a ground clearance sensor, a slip ratio sensor, and an environmental sensor.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for detecting the occurrence of a loss-of-traction event and entering an assist mode to provide traction assistance to help overcome the loss-of-traction event. More particularly, various embodiments of the technology disclosed herein relate to an electronic all-wheel drive (AWD) or multi-wheel-drive system for a vehicle, such as, for example, a hybrid electric vehicle (HEV), for off-road or other traction-challenged conditions. In some embodiments, a traction assistance enabling switch can be provided for situations in which the vehicle (e.g., the HEV) is slipping/stuck, to adjust the torque applied to one or more assist wheels. When the driver determines that an slippage event is occurring, the driver can select the assistance mode by operating the traction assistance enabling switch. In other embodiments, conditions sensed by various sensors can be monitored to detect a slippage, or loss-of-traction event automatically to trigger the assist mode.

Before describing embodiments of the technology in detail, it is useful to describe an example vehicle with which the technology may be implemented. Although the example described herein is a hybrid type of vehicle as shown in FIG. 1, the systems and methods for automatic turn signal actuation can be implemented in other types of vehicle including gasoline- or diesel-powered vehicles, fuel-cell vehicles, electric vehicles, or other suitably powered vehicles.

Figure 1:
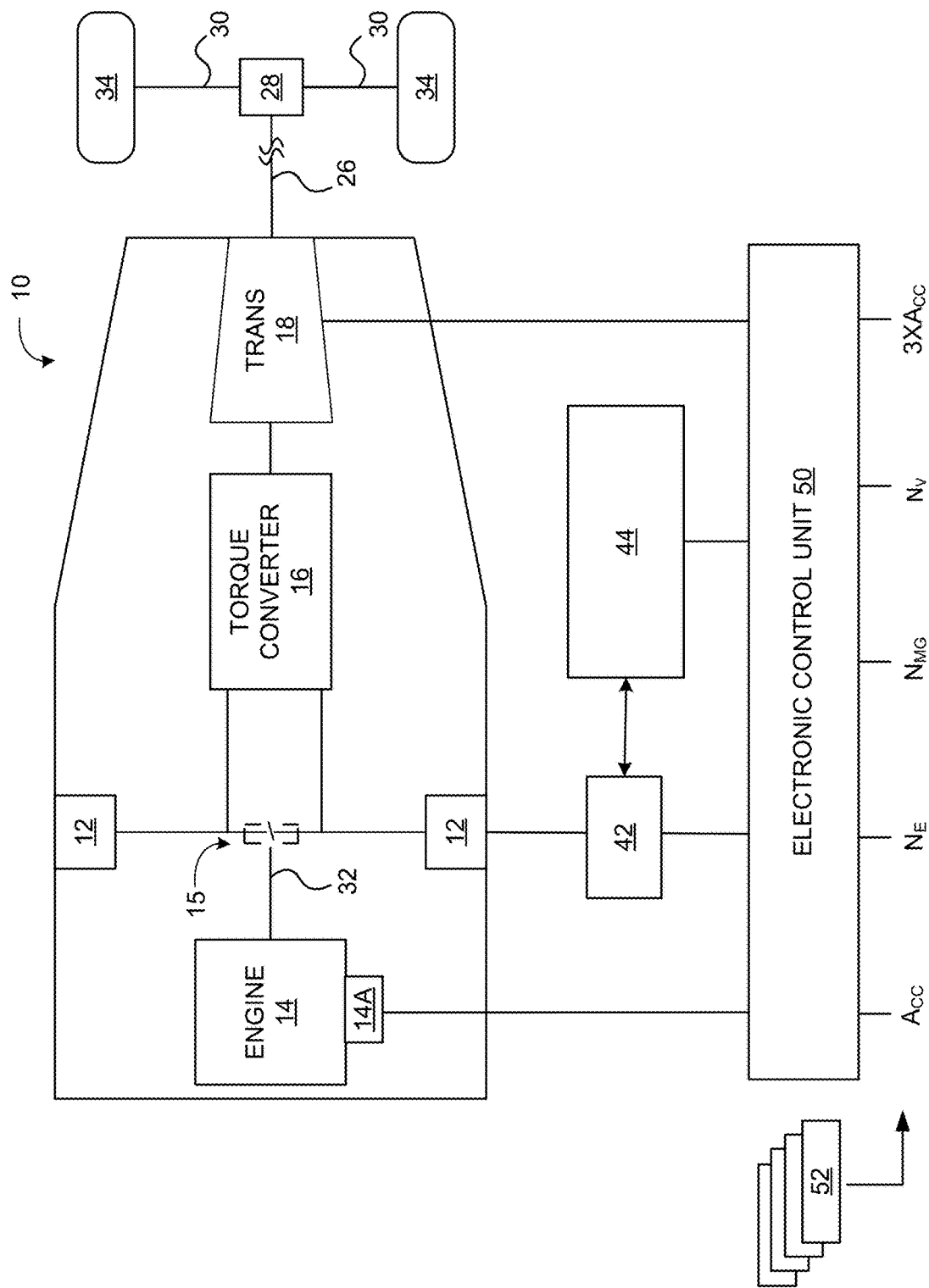
FIG. 1 illustrates an example of a vehicle with which systems and methods for an assist mode may be implemented in accordance with one embodiment of the systems and methods described herein.

FIG. 1 illustrates an example of a vehicle with which systems and methods for automatic assist mode activation be implemented. The example illustrated in FIG. 1 is that of a hybrid vehicle a drive system of a vehicle 10 that may include an internal combustion engine 14 and one or more electric motors 12 as sources of motive power. Driving force generated by the internal combustion engine 14 and motors 12 can be transmitted to one or more wheels 34 via a torque converter 16, a transmission 18, a differential gear device 28, and a pair of axles 30.

As a hybrid vehicle, vehicle 10 may be driven/powered with either or both of engine 14 and the motor(s) 12 as the drive source for travel. For example, a first travel mode may be an engine-only travel mode that only uses the internal combustion engine 14 as the drive source for travel. A second travel mode may be an EV travel mode that only uses the motor(s) 12 as the drive source for travel. A third travel mode may be an HEV hybrid travel mode that uses engine 14 and the motor(s) 12 as drive sources for travel. In the engine-only and HEV travel modes, hybrid vehicle 10 relies on the motive force generated at least by internal combustion engine 14 and a clutch 15 may be included to engage engine 14. In the EV travel mode, hybrid vehicle 10 is powered by the motive force generated by motors 12 while engine 14 may be stopped and clutch 15 disengaged.

Engine 14 can be an internal combustion engine such as a gasoline, diesel, or similarly powered engine in which fuel is injected into and combusted in a combustion chamber. Engine 14 can also be a motive power source other than an ICE, such as, for example, a hydrogen fuel cell or other fuel-cell power source. An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motors 12 can also be used to provide motive power in vehicle 10, and may be powered electrically via a power storage device 44. Motors 12 can be powered by power storage device 44 to generate a motive force to move the vehicle and adjust vehicle speed. Motors 12 can also function as a generator to generate electrical power such as, for example, when coasting or braking. Although motors 12 are illustrated as driving two rear wheels of vehicle 10 (via clutch 15, torque converter 16 and transmission 18), other configurations are possible such as, for example, one motor driving multiple wheels, one or more motors driving the front wheels, and so on.

Motors 12 may be connected to power storage device 44 via an inverter 42. Power storage device 44 can include, for example, one or more batteries, capacitive storage units, or other storage reservoirs suitable for storing electrical energy that can be used to power one or more motors 12. When power storage device 44 is implemented using one or more batteries, the batteries can include, for example, nickel metal hydride batteries, lithium ion batteries, lead acid batteries, nickel cadmium batteries, lithium ion polymer batteries, and other types of batteries. Power storage device 44 may also be used to power other electrical or electronic systems in the vehicle. Although not illustrated, photovoltaic cells can also be used to charge power storage device 44 or otherwise provide electrical current to vehicle systems.

An electronic control unit 50 (described below) may be included and may control the electric drive components of the vehicle as well as other vehicle components. For example, electronic control unit 50 may control inverter 42, adjust driving current supplied to motors and adjust the current received from motors 12 during regenerative coasting and breaking. As a more particular example, output torque of the motors 12 can be increased or decreased by electronic control unit 50 through the inverter 42.

A torque converter 16 can be included to control the application of power from engine 14 and motors 12 to transmission 18. Torque converter 16 can include a viscous coupling the transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motors 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

Vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 10. For example, electronic control unit 50 may receive signals that indicate an accelerator operation amount, $A_{CC}$, a revolution speed, $N_E$, of engine 14 (engine RPM), a rotational speed, $N_{MS}$, of the motors 12 (motor rotational speed), a vehicle speed, Nv, and energy storage amount, E, indicating (remaining capacity, charged amount for power storage device 44). Accordingly, vehicle 10 can include a plurality of sensors 52 they can be used to detect various conditions internal or external to the vehicle and provide sensed conditions to electronic control unit 50 (which, again, may be implemented as one or a plurality of individual control circuits). In one embodiment, sensors 52 may be included to detect one or more conditions such as, for example, vehicle speed and changes in speed, vehicle attitude (i.e., roll pitch and yaw), vehicle braking, steering wheel angle and rotation (and speed of rotation), driver alertness, and so on.

A further example of a sensor 52 may be a 3-axis accelerometer to detect vehicle dynamics (3XAcc). One or more 3-axis accelerometers can be used, for example, to determine acceleration of vehicle 10, as well as, for example, the vehicle attitude (i.e., roll, pitch and yaw experienced by the vehicle). In accordance with various embodiments, acceleration/deceleration information from the 3-axis accelerometers may be sent to electronic control unit 50 so that electronic control unit 50 may calculate acceleration, deceleration, attitude, or other vehicle parameters based on acceleration/deceleration data from the accelerometers. This rate of acceleration or deceleration can be used, for example, when determining whether to actuate a turn signal in accordance with various embodiments described below.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In yet further embodiments, hybrid sensors may be included that provide a combination of raw data and processed data to electronic control unit 50. Sensor 52 may provide an analog output or a digital output.

Sensors 52 may be included to detect not only vehicle conditions but also to detect external conditions as well. Sensors that might be used to detect external conditions can include, for example, environmental sensors such as temperature, humidity, salinity and precipitation sensors. Another example of sensors that detect external conditions can include sonar, radar, lidar or other vehicle proximity sensors and cameras or other image sensors. Vehicle proximity sensors may be used to detect, for example, the proximity of the subject vehicle to other objects such as vehicles or barriers or to detect vehicle clearance from the ground or other obstacles. Image sensors can be used to detect, for example, the presence of lanes (e.g. by detecting lines in the road, curbing, medians, etc.), traffic signs, road curvature, obstacles, and so on. While some sensors can be used to actively detect passive environmental objects, other sensors can be included and used to detect active objects such as those objects used to implement smart roadways that may actively transmit data or other information.

Figure 2:
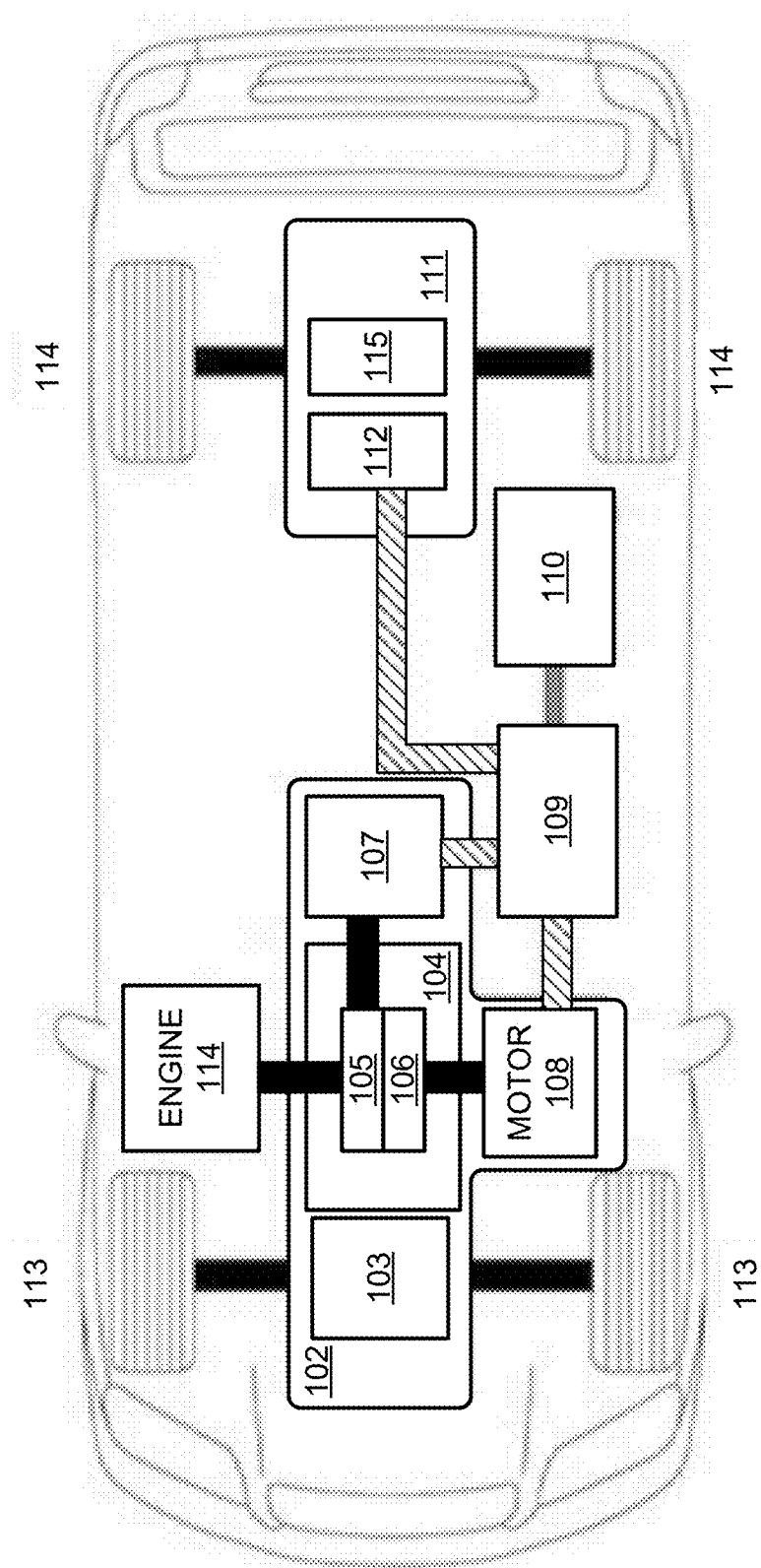
FIG. 2 is another example of a vehicle with which systems and methods for assist mode be implemented.

FIG. 2 is another example of a vehicle with which systems and methods for assist mode be implemented. The example illustrated in FIG. 2 is also that of a hybrid vehicle drive system of a vehicle 110 that may also include an engine 114 (e.g., engine 14) and one or more electric motors 108, 112 as sources of motive power. In this example, a hybrid transaxle 102 includes differential 103, a compound gear unit 104, a motor 108, and a generator 107. Compound gear unit 104 includes a power split planetary gear unit 105 and a motor speed reduction planetary gear unit 106. This example vehicle also includes two drive motors 108, 112, an inverter with converter assembly 109, batteries 110, and a rear differential 115. Hybrid transaxle assembly 102 enables power from engine 101, motor 108, or both to be applied to front wheels 113 via front differential 103.

Inverter with converter assembly 109 inverts DC power from batteries 110 to create AC power to drive AC motors 108, 112. In embodiments where motors 108, 112 are DC motors, no inverter is required. Inverter with converter assembly 109 also accepts power from generator 107 (e.g., during engine charging) and uses this power to charge batteries 110.

The examples of FIGS. 1 and 2 are provided for illustration purposes only as examples of vehicle systems with which embodiments of the disclosed technology may be implemented. One of ordinary skill in the art reading this description will understand how the disclosed embodiments can be implemented with other all-wheel-drive or multi-wheel-drive vehicle platforms.

Figure 3:
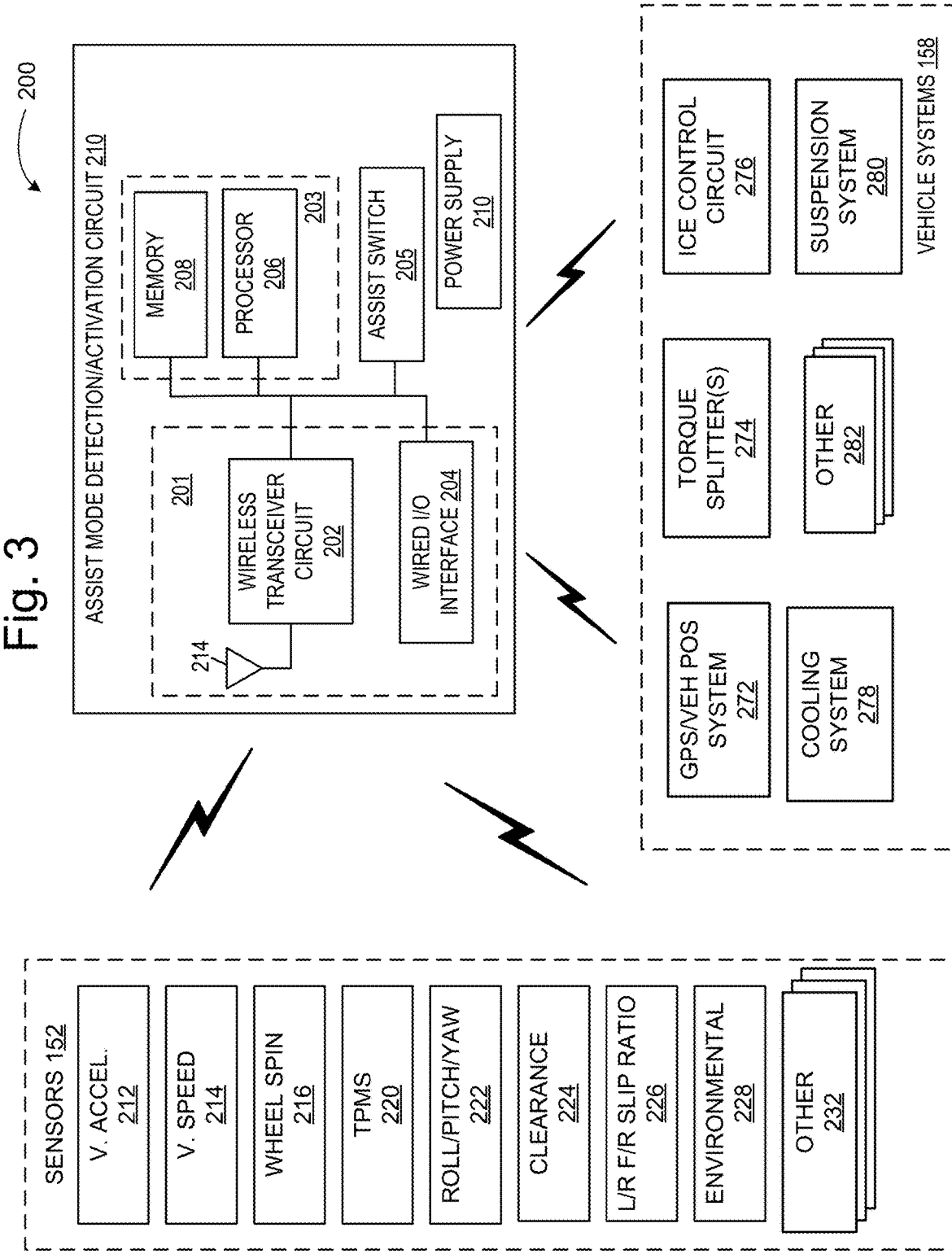
FIG. 3 illustrates an example architecture for detecting possible slippage and entering an assist mode in accordance with one embodiment of the systems and methods described herein.

FIG. 3 illustrates an example architecture for detecting possible slippage and entering an assist mode in accordance with one embodiment of the systems and methods described herein. Referring now to FIG. 3, in this example, assist mode detection and activation system 200 includes an assist-mode detection/activation circuit 210, a plurality of sensors 152, and a plurality of vehicle systems 158. Sensors 152 and vehicle systems 158 can communicate with assist-mode detection/activation circuit 210 via a wired or wireless communication interface. Although sensors 152 and vehicle systems 158 are depicted as communicating with assist-mode detection/activation circuit 210, they can also communicate with each other as well as with other vehicle systems. Assist-mode detection/activation circuit 210 can be implemented as an ECU or as part of an ECU such as, for example electronic control unit 50. In other embodiments, assist-mode detection/activation circuit 210 can be implemented independently of the ECU.

Assist-mode detection/activation circuit 210 in this example includes a communication circuit 201, a decision circuit (including a processor 206 and memory 208 in this example) and a power supply 212. Components of assist-mode detection/activation circuit 210 are illustrated as communicating with each other via a data bus, although other communication in interfaces can be included. Assist-mode detection/activation circuit 210 in this example also includes a manual assist switch 205 that can be operated by the user to manually select the assist mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to assist-mode detection/activation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a assist-mode detection/activation circuit 210.

Communication circuit 201 either or both a wireless transceiver circuit 202 with an associated antenna 214 and a wired I/O interface 204 with an associated hardwired data port (not illustrated). As this example illustrates, communications with assist-mode detection/activation circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by assist-mode detection/activation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, NiH$_2$, rechargeable, primary battery, etc.), a power connector (e.g., to connect to vehicle supplied power, etc.), an energy harvester (e.g., solar cells, piezoelectric system, etc.), or include any other suitable power supply.

Sensors 152 can include, for example, sensors 52 such as those described above with reference to the example of FIG. 1. Sensors 52 can include additional sensors that may or not otherwise be included on a standard vehicle 10 with which the turn assist-mode system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of assist-mode system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, assist mode detection/activation circuit 210 can receive information from various vehicle sensors to determine whether the assist mode should be activated. Also, the driver may manually activate the assist mode by operating assists which 205. Communication circuit 201 can be used to transmit and receive information between assist-mode detection/activation circuit 210 and sensors 152, and assist-mode detection/activation circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate the assist mode. Additionally, communication circuit 201 can be used to send an activation signal or other activation information to various vehicle systems 158 as part of entering the assist mode. For example, as described in more detail below, communication circuit 201 can be used to send signals to, for example, one or more of: torque splitters 274 to control front/rear torque split and left/right torque split; motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152. Examples of this are described in more detail below.

Figure 4:
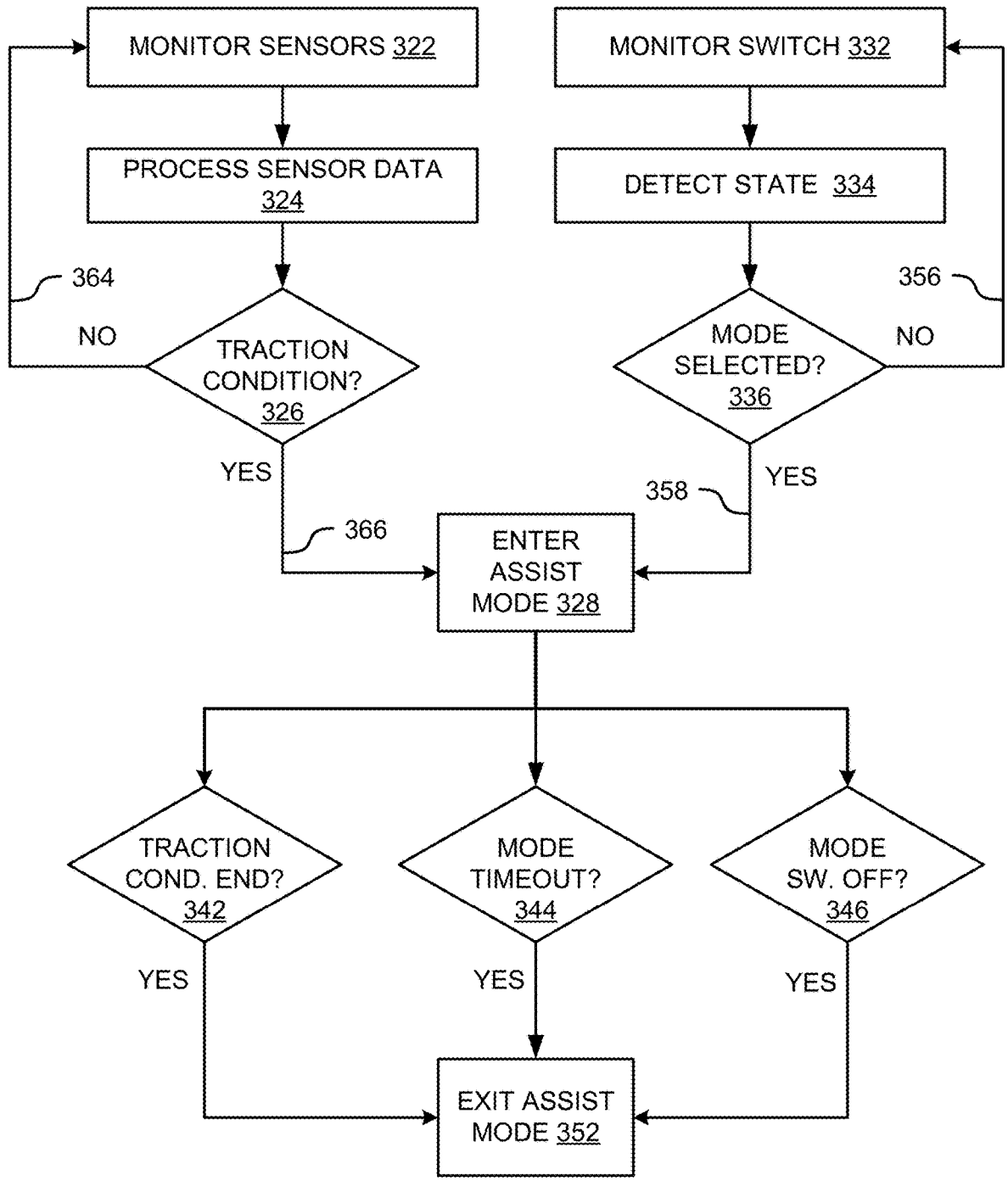
FIG. 4 is a diagram illustrating an example of the operation of assist mode detection/activation circuitry (e.g., assist-mode detection/activation circuit 210) in accordance with one embodiment of the systems and methods described herein.

FIG. 4 is a diagram illustrating an example of the operation of assist mode detection/activation circuitry (e.g., assist-mode detection/activation circuit 210) in accordance with one embodiment of the systems and methods described herein. This example illustrates two avenues for entering and assist mode. One way that the assist mode can be activated is by monitoring sensor information (e.g. sensors 52, sensors 152) to determine whether a traction condition exists. The other way that the assist mode can be activated in this example is a by monitoring the state of a switch that can be activated by the driver, passenger or other vehicle user. Another way that assist mode can be activated (not illustrated) is by remote activation such as from a help center like the Toyota SafetyConnect® or by roadside assistance.

Referring now to FIG. 4, at operation 322, the assist mode circuitry monitors various vehicle sensors to determine whether a traction condition is occurring. This determination can be made, for example, by monitoring vehicle characteristics such as wheel slip, activation of a sequential or low-range gear setting, vehicle rocking back and forth, gear selector switches back and forth between Reverse and a Forward at a rapid rate (which may be accompanied by wide-open-throttle condition), a reduction in tire pressure, location information (e.g., in a sandy environment such as the beach or the desert), a change in vehicle attitude indicating reduced traction, uneven front/rear or left/right slipping ratios, the detection of salty air, and so on. Information from sensors such as these can be processed at operation 324 to determine a likelihood that the vehicle is stuck or otherwise in a low-traction condition. If at operation 326 the assist mode circuitry determines that a traction condition does not exist, the system continues to monitor the sensors 322 as illustrated by flow line 364. If, on the other hand, the assist mode circuitry determines that a traction condition does exist, it enters the assist mode. This is illustrated by flowline 366 and operation 328. The assist mode can take on various different forms or combination of forms depending on the type of loss-of-traction event detected or predicted by the assist mode circuitry. Examples of these are described below with reference to FIG. 6.

With continued reference to FIG. 4, another way for entering the assist mode is via monitoring a switch for manual or user-selected operation. Accordingly, at operation 332 the assist mode circuitry monitors a signal that is activated by an assist mode switch (e.g., assist switch 205). For example, presence of a ground signal, voltage level, current level, data string, and so on added input from the switch can indicate to the assist mode circuitry that the switch has been activated. At operations 334 and 336 the assist mode circuitry evaluates the signal to determine whether the assist mode has been selected by the user.

If at operation 336 the assist mode circuitry determines that a traction condition does not exist, the system continues to monitor the switch at operation 332 as illustrated by flow line 356. If, on the other hand, the assist mode circuitry determines that the switch has been activated, it enters the assist mode. This is illustrated by flowline 358 and operation 328. As with automatic activation, the assist mode can take on various different forms or combination of forms depending on information detected from the sensors. Examples of these are described below with reference to FIG. 6.

In various embodiments, the assist mode circuitry can also include circuitry to exit the assist mode. The example illustrated in FIG. 4 illustrates 3 examples for exiting the assist mode. A first example 342 is determining whether the traction condition has ended. For example, the assist mode circuitry can continue to monitor sensor data to determine whether any traction conditions still exist. If none exist, the system can exit the assist mode at operation 352. In some embodiments, a time threshold can be provided such that the assist mode circuitry waits a predetermined period of time from the end of the traction conditions before exiting the assist mode. A second example 344 uses a timeout to determine whether a predetermined period of time has passed since the assist mode was entered. If that predetermined. Of time has passed, the system exits the assist mode at operation 352. A third example for exiting the assist mode is determining whether the assist mode switch has been switched from on to off at operation 346. This may indicate, for example, that the user has determined that the assist mode is no longer needed in the user, as a result, turned off the switch. In this condition, the system exits the assist mode at operation 352.

Figure 5:
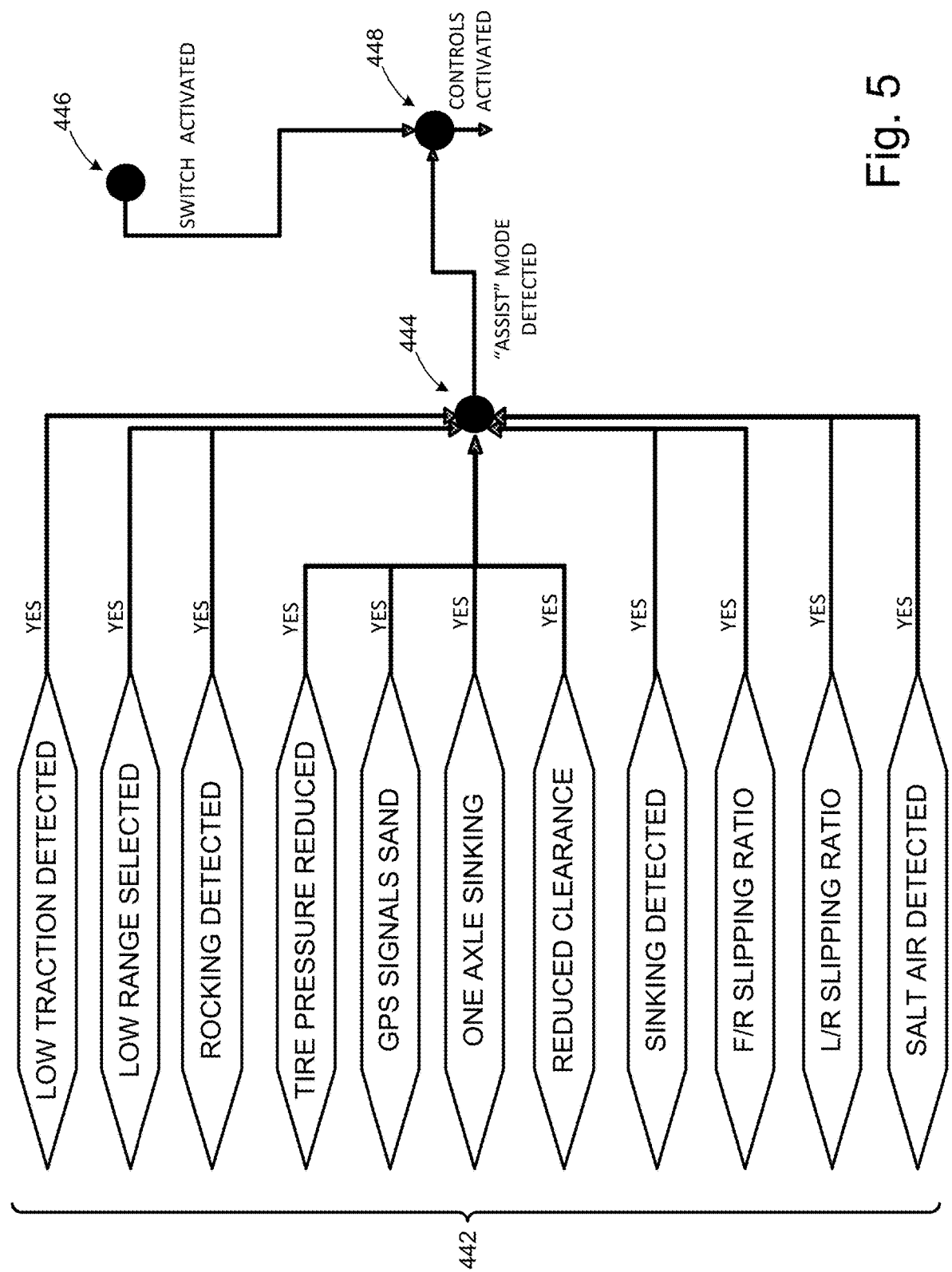
FIG. 5 is a diagram illustrating examples of various conditions that can be detected by assist mode circuitry (e.g., assist-mode detection/activation circuit 210) in accordance with one embodiment of the systems and methods described herein.

FIG. 5 is a diagram illustrating examples of various conditions that can be detected by assist mode circuitry (e.g., assist-mode detection/activation circuit 210) in accordance with one embodiment of the systems and methods described herein. With reference now to FIG. 5, this example depicts eleven examples of sensor-based detection 442 and one example of switch-based detection 446 to determine whether to enter the assist mode 448. In this example if any one of these events 442 is detected, the assist mode is deemed to be detected 444 and activated 448. In other embodiments, the system can require various combinations of events 442 to be detected before entering the assist mode.

The first example in this diagram is detecting an amount of wheel slippage. The system can be configured to trigger the assist mode when any wheel slippage is detected, or based on an amount of wheel slippage above a determined threshold. The system can also be configured to monitor the vehicle transmission to determine whether the user shifted the vehicle to a sequential gear setting or a "low-range" gear setting. Either of these gear settings may indicate a traction condition exists. The system can also be configured to determine whether the user is attempting to rock the vehicle out of a stock condition. This may be detected, for example, by repeated shifts between forward and reverse gears, which may also be accompanied by wide-open-throttle (WOT) conditions. This may occur, for example, when the user is attempting to rock the vehicle back and forth to get it out of a stuck position. In some instances, this may be occurring while the vehicle is standing still, while in other instances a back-and-forth rocking motion of the vehicle may accompany these repeated shifts.

Another example is based on reduced tire pressure. A situation where the tire pressure is reduced rapidly and then maintained without further reduction at a lower pressure state may indicate that the user reduced the pressure of the tires intentionally to increase traction. Accordingly, information from the tire pressure monitoring system (TPMS) can be used to detect this condition.

Another example is monitoring vehicle position such as by the GPS or other vehicle positioning system. If the vehicle position indicates that the vehicle is on the sand (e.g., at the beach or off-road in the desert), the system may enter the assist mode.

As yet another example, accelerometers or other like sensors can be used to determine whether the vehicle is sinking, which may indicate a traction condition. For example, roll pitch and yaw sensors may be used to determine whether the grade (i.e., pitch) is changing while the vehicle is not moving, which may indicate one axle is sinking. Such a sensor may also detect and indicate a condition where the vehicle is not moving forward or backward but the left or right angle changes (i.e., roll), which may indicate the left or right side of the vehicle is sinking. Additionally, such a sensor may also detect and indicate a condition in which the vehicle is not moving forward or backward, but the distance to the ground is reducing, which may indicate that the vehicle is sinking. Although not illustrated in FIG. 5, excessive yaw may also indicate the presence of a traction condition. In addition to or in place of accelerometers, distance detection circuits such as, for example, lidar, radar, sonar or other proximity detection circuitry may be used to detect the various sinking conditions described above. For example, ultrasonic sensors can provide a cost-effective solution to determine distance of the vehicle, or part of the vehicle (e.g., where multiple sensors are placed at various positions along the undercarriage) from the ground.

In another example, the front/rear and left/right slip ratios can be monitored to detect a traction condition. Also, the system can use environmental sensors to detect salty air, which may indicate that the vehicle is at the beach.

As noted above, in some embodiments the system can be configured such that the assist mode is triggered upon the occurrence of any one of these conditions. In other embodiments, the system can be configured to monitor for various combinations of these conditions, in parallel or in sequence, before entering the assist mode. In still further embodiments, the system may be configured such that certain of these example conditions are sufficient by themselves for automatic entry into the escape mode, whereas other conditions must exist in combination.

In various embodiments, thresholds can be set for the trigger conditions that are monitored to detect attraction mode. For example, in some embodiments any amount of wheel slippage is sufficient to trigger the assist mode whereas in other embodiments, the wheel slippage must be above a certain amount before the assist mode is activated. As another example, in some embodiments any amount of front/rear slipping ratio is sufficient to trigger the assist mode, while in other embodiments, the front/rear slipping ratio must be greater than a threshold amount before the assist mode is triggered. These examples serve to illustrate the thresholds can be utilized to configure the system for a predetermined amount of forgiveness before entering the assist mode. In some embodiments, thresholds for entering the assist mode can be different from thresholds for exiting the assist mode. For example, a certain amount of hysteresis can be built into the system (e.g., a lower threshold used for the loss-of-traction event before terminating the assist mode) so that the vehicle isn't switching in and out of the assist mode if the traction condition is existing at or near the activation threshold.

Figure 6:
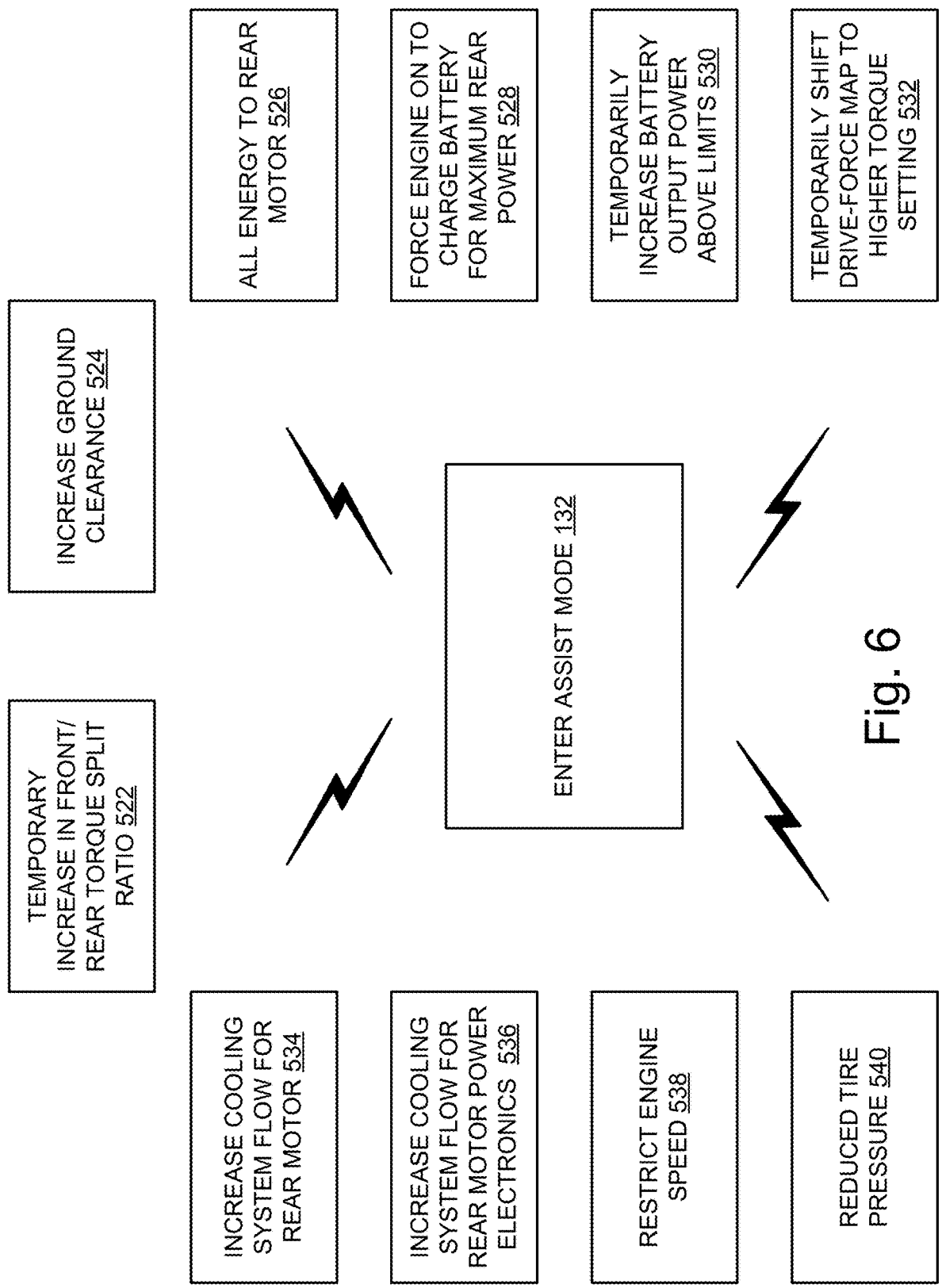
FIG. 6 illustrates various examples of assist mode that can be activated by assist mode circuitry in accordance with embodiments of the systems and methods described herein.

FIG. 6 illustrates various examples of assist mode that can be activated by assist mode circuitry to alter vehicle drivetrain characteristics in accordance with embodiments of the systems and methods described herein. In various embodiments, when the vehicle enters the assist mode at operation 132, any one or more of a number of different assist modes can be engaged. In the illustrated example, one option is to increase the front/rear torque split ratio. For example, rather than a 50/50 front/rear torque split ratio, the system can increase the torque to the front or rear axle (e.g., the axle opposite the one on which slippage is detected) to provide more torque to the assist wheels. In one embodiment, this can be applied until sensors indicate that the vehicle is no longer stuck or no longer in a loss-of-traction event. In other embodiments, this is only done temporarily to avoid applying added torque to one axle or the other for prolonged periods of time. Instead of a 50/50 torque split, the ratios can be altered anywhere from 50/50 up to, for example, up to 100/0 or 0/100 as needed.

At operation 524, the system can be configured to increase the ground clearance of the vehicle. This may be done, for example, when sensors indicate that ground clearance of the vehicle is compromised. In some applications, the ground clearance can be altered using vehicle air suspension systems if the vehicle is so equipped. The system can continue to monitor ground clearance and return the vehicle to a normal ride height when the ground clearance condition is determined to have been alleviated.

At operation 526, the system can configure the drivetrain such that all energy is applied to the rear motor or motors (or alternatively, to the front motors). For example, the transmission hydraulic switch (THS) can be actuated to disengage the transmission such that the engine is no longer driving, or providing motive force to, the front wheels (e.g., as in the example application of FIG. 2 in which the engine drives the front wheels). In situations where it is desirable to apply all power to the rear wheels, the front electric motor(s) (if present in the vehicle) can be shut down as well. In alternative embodiments, the system can be configured such that all energy is applied to the front motor(s). Note, in applications in which the engine drives the rear wheels, the THS might not be deactivated where it is desirable to apply more power to the rear wheels. In this circumstance, the rear motor might be engaged to assist the engine even if under normal driving conditions, the rear motor might not be engaged.

At operation 528 the system may force the engine ON to charge the battery to allow maximum rear motor power. Again, in situations in which it is desirable to increase power at the rear wheels. At operation 530, the system may temporarily increase battery output power above normal limits to provide additional power to the front or rear motors, as desired. This may be done in combination with forcing the engine to an ON state for battery charging purposes.

At operation 530 to the system can be figured to shift the drive-force map to a higher torque setting to allow better control. This could be set, for example, to allow more torque to be applied to the desired wheels (e.g., where the issue is overcoming an obstacle), to limit the amount of torque available at the desired wheels (e.g., in the case of slippage conditions), or to give the driver finer control over the amount of torque applied.

At operations 534 and 536 the cooling system can be adjusted to increase the cooling system flow for the rear motor (or front motor, depending on the vehicle configuration and traction condition) power electronics and for the rear motors themselves. This can be used, for example, in combination with running the motors at or near maximum motor power to ensure that neither the motors nor the associated electronics overheat. This can improve the durability of the electric drive system.

At operation 538, the system can adjust a rev limiter or other like circuit to restrict the engine speed. For example, rev limiter can be used to force a low-speed high-torque condition for the desired assist motor. In other words, the engine speed can be capped to limit rotation speed.

At operation 540, the tire pressure can be reduced to increase traction, and the tires can be re-inflated to the normal operating pressure when the vehicle is no longer in the traction condition. This can be accomplished on vehicles equipped with tire pressure adjustment capabilities.

As these examples serve to illustrate, there are number of actions that the assist mode circuitry can take to alter the vehicle's performance characteristics such as by increasing or decreasing the amount of torque applied to certain wheels for axles, depending on the traction condition detected. After reading this description, one of ordinary skill in the art will understand how other actions can be taken for an assist mode.

Figure 7:
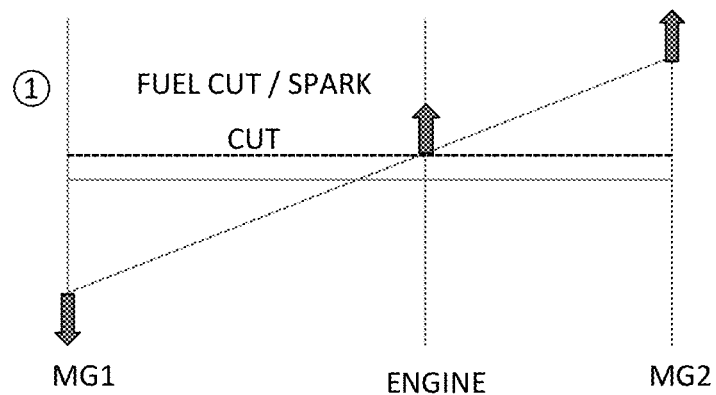
FIG. 7 illustrates examples of restricting motor speed for increased torque in accordance with embodiments of the systems and methods described herein.
Figure 7:
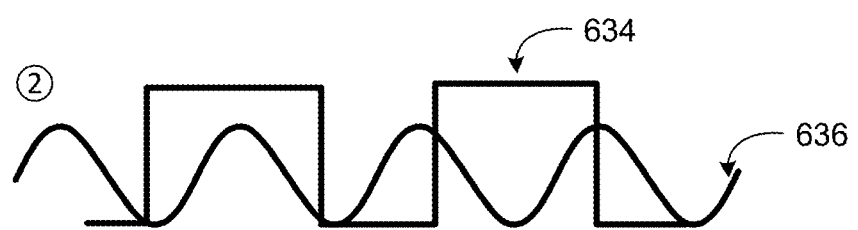

FIG. 7 illustrates examples of restricting motor speed for increased torque in accordance with embodiments of the systems and methods described herein. In the top half of FIG. 7, this illustrates an example of cutting the fuel or spark to the engine to restrict the speed of motor MG2 to reduce the slip potential. This can be thought of as creating a pseudo-low-gear hold situation. The bottom half of FIG. 7 illustrates an example of restricting MG to speed by switching the pulse width modulation (PWM) controls of the MG2 motor from sinusoidal 636 (fine control) to a square wave 634 (course control) for maximum torque at low speeds. This can be done, for example, in combination with cutting the fuel or the spark to the engine. In various embodiments, this PWM mode is limited as operating in this mode is generally not desirable from a durability perspective.

Figure 8:
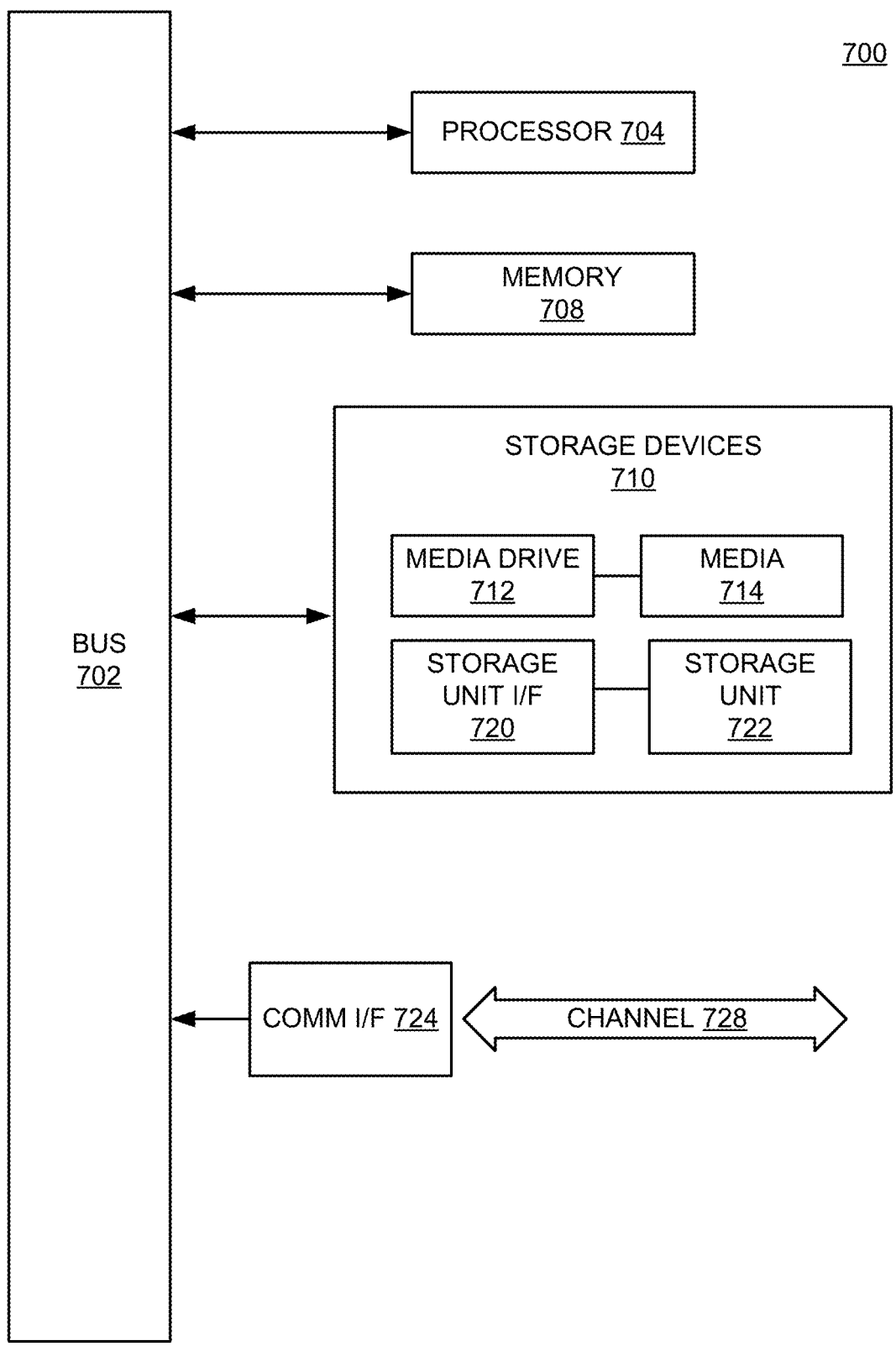
FIG. 8 illustrates an example computing module that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 8. Various embodiments are described in terms of this example-computing system 700. After reading this description, it will become apparent to a person skilled in the relevant art how to implement the technology using other computing systems or architectures.

Referring now to FIG. 8, computing system 700 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 700 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 700 might include, for example, one or more processors, controllers, control modules, or other processing devices, such as a processor 704. Processor 704 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 704 is connected to a bus 702, although any communication medium can be used to facilitate interaction with other components of computing system 700 or to communicate externally.

Computing system 700 might also include one or more memory modules, simply referred to herein as main memory 708. For example, in some embodiments random access memory (RAM) or other dynamic memory, might be used for storing information and instructions to be executed by processor 704. Main memory 708 might also be used for storing temporary variables or other intermediate information during execution of instructions to be executed by processor 704. Computing system 700 might likewise include a read only memory ("ROM") or other static storage device coupled to bus 702 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), a flash drive, or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing system 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a flash drive and associated slot (for example, a USB drive), a PCMCIA slot and card, and other fixed or removable storage units 722 and interfaces 720 that allow software and data to be transferred from the storage unit 722 to computing system 700.

Computing system 700 might also include a communications interface 724. Communications interface 724 might be used to allow software and data to be transferred between computing system 700 and external devices. Examples of communications interface 724 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for an assist mode in a hybrid electric vehicle, comprising:
   receiving signals from a plurality of vehicle sensors monitoring respective conditions of the hybrid electric vehicle;
   an assist mode circuit determining whether a loss-of-traction condition is being experienced by the hybrid electric vehicle using information in the signals received from at least one of the plurality of vehicle sensors; and
   activating an assist mode of the hybrid electric vehicle if the assist mode circuit determines that a loss-of-traction condition is being experienced, wherein the assist mode alters vehicle drive train characteristics by generating a low-gear hold condition in a transmission of the hybrid electric vehicle.

2. The method of claim 1, wherein the loss-of-traction condition comprises at least one of wheel slippage, roll or pitch of the hybrid electric vehicle when the hybrid electric vehicle is stationary, sinking of the hybrid electric vehicle, a change in a left/right or front/rear slip ratio of the hybrid electric vehicle, and a lowering of vehicle tire pressure by greater than a predetermined amount.

3. The method of claim 1, wherein the assist mode further comprises increasing motive power provided to an assist wheel of the hybrid electric vehicle.

4. The method of claim 1, wherein the assist mode further comprises increasing torque applied to a wheel of the hybrid electric vehicle by a motor driving that wheel by changing pulse-width-modulation controls of the motor from a sinusoidal control to a square wave control.

5. The method of claim 1, wherein the assist mode further comprises increasing torque to a first axle opposite a second axle on which slippage is detected to provide more torque to the assist wheels.

6. The method of claim 5, wherein the increased torque is applied until sensors indicate that the hybrid electric vehicle is no longer stuck or no longer in a loss-of-traction event.

7. The method of claim 1, wherein the assist mode further comprises disengaging the vehicle transmission such that the engine is no longer providing motive force to the wheels.

8. The method of claim 1, wherein the assist mode further comprises forcing the engine of the HEV on to charge a battery of the hybrid electric vehicle to allow an increase in motor power at an assist wheel.

9. The method of claim 1, wherein the assist mode further comprises increasing battery output power above specified normal limits to provide additional power to an assist wheel.

10. The method of claim 1, wherein the assist mode further comprises increasing a cooling system flow for a motor driving an assist wheel or power electronics that enable the motor at a higher power level.

11. The method of claim 1, wherein the assist mode further comprises increasing ground clearance of the hybrid electric vehicle.

12. The method of claim 1, wherein the assist mode further comprises reducing tire pressure of vehicle tires to increase traction.

13. An assist mode circuit for a vehicle, comprising:
   a plurality of sensors to sense vehicle conditions;
   a communications receiver to receive information from at least one of the plurality of sensors regarding the vehicle conditions;
   an assist-mode circuit to determine whether the vehicle is encountering a loss-of-traction event and to activate a vehicle assist mode if the assist-mode circuit determines that the vehicle is encountering a loss-of-traction event;
   a communications transmitter to transmit instructions to a vehicle system to implement the assist mode, the assist mode comprising generating a low-gear hold condition in a transmission of the vehicle.

14. The assist mode circuit of claim 13, wherein the plurality of sensors comprise at least one of a wheelspin sensor, a tire pressure monitoring system, a three axis accelerometer, a ground clearance sensor, a slip ratio sensor, and an environmental sensor.

15. The assist mode circuit of claim 13, wherein the assist mode further comprises increasing motive power provided to an assist wheel of the vehicle.

16. The assist mode circuit of claim 13, wherein the assist mode further comprises increasing torque applied to a wheel of the vehicle by a motor driving that wheel by changing pulse-width-modulation controls of the motor from a sinusoidal control to a square wave control.

17. The assist mode circuit of claim 13, wherein the assist mode further comprises increasing torque to a first axle opposite a second axle on which slippage is detected to provide more torque to the assist wheels.

18. The assist mode circuit of claim 13, wherein the assist mode further comprises disengaging the vehicle transmission such that the engine is no longer providing motive force to the wheels.

19. The assist mode circuit of claim 13, wherein the assist mode further comprises forcing the engine of the vehicle on to charge a battery of the vehicle to allow an increase in motor power at an assist wheel.

20. The assist mode circuit of claim 13, wherein the assist mode further comprises increasing battery output power above specified normal limits to provide additional power to an assist wheel.

21. The assist mode circuit of claim 13, wherein the assist mode further comprises increasing cooling system flow for a motor at driving the assist wheel or power electronics of that motor to enable that motor at a higher power level.

22. The assist mode circuit of claim 13, wherein the assist mode further comprises increasing ground clearance of the vehicle.

23. The assist mode circuit of claim 13, wherein the assist mode further comprises reducing tire pressure of vehicle tires to increase traction.

\* \* \* \* \*